United States Patent
Yasukochi et al.

(10) Patent No.: US 11,260,609 B2
(45) Date of Patent: Mar. 1, 2022

(54) COMPOSITE MANUFACTURING APPARATUS

(71) Applicant: SUBARU CORPORATION, Tokyo (JP)

(72) Inventors: Natsumi Yasukochi, Tokyo (JP); Tomoyoshi Kuniya, Tokyo (JP); Daisuke Hirabayashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/126,711

(22) Filed: Dec. 18, 2020

(65) Prior Publication Data

US 2021/0299984 A1    Sep. 30, 2021

(30) Foreign Application Priority Data

Mar. 25, 2020  (JP) ............................. JP2020-054218

(51) Int. Cl.
*B29C 70/54*    (2006.01)
*B29C 70/32*    (2006.01)
*B29C 70/34*    (2006.01)

(52) U.S. Cl.
CPC ............ *B29C 70/546* (2013.01); *B29C 70/32* (2013.01); *B29C 70/34* (2013.01)

(58) Field of Classification Search
CPC ......... B29C 70/16; B29C 43/20; B29C 70/46; B29C 70/38; B29C 43/34; B29C 70/386; B29C 70/545; B29C 70/54; B29C 70/546; B29C 70/34; B29C 31/08; B29C 70/32
See application file for complete search history.

(56) References Cited

U.S. PATENT DOCUMENTS

| | | | |
|---|---|---|---|
| 4,949,441 A | 8/1990 | Ethridge | |
| 2020/0190700 A1* | 6/2020 | Yasukochi | ............ B29C 70/54 |

FOREIGN PATENT DOCUMENTS

| | | | | |
|---|---|---|---|---|
| EP | 2 987 896 A1 | 2/2016 | | |
| JP | 2004-058593 A | 2/2004 | | |
| JP | 2012-207359 A | 10/2012 | | |
| WO | WO 2011/116191 A1 | 9/2011 | | |
| WO | WO-2011116191 A1 * | 9/2011 | ........... | B29C 70/388 |
| WO | WO 2015/009938 A1 | 1/2015 | | |
| WO | WO 2020/040155 A1 | 2/2020 | | |

OTHER PUBLICATIONS

Extended European Search Report dated Aug. 11, 2021 for European Patent Application No. 21159354.6-1017.

* cited by examiner

*Primary Examiner* — Vishal I Patel (74) *Attorney, Agent, or Firm* — McGinn IP Law Group, PLLC (57) ABSTRACT

A composite manufacturing apparatus includes a width determining mechanism and a gas supplier. The width determining mechanism has a body and a gas passage. The body has a path configured to allow a tape material including fibers impregnated with a resin to pass therethrough. The path has a bottom surface and a pair of wall surfaces. The pair of the wall surfaces form a gap that gradually decreases. The gas passage is provided inside the body and formed by the bottom surface having a plurality of through holes, and is in communication with the plurality of through holes. The gas supplier is configured to supply gas to the gas pass age.

8 Claims, 6 Drawing Sheets

COMPOSITE MANUFACTURING APPARATUS

CROSS-REFERENCE TO RELATED APPLICATIONS

The present application claims priority from Japanese Patent Application No. 2020-054218 filed on Mar. 25, 2020, the entire contents of which are hereby incorporated by reference.

BACKGROUND

The technology relates to a composite manufacturing apparatus that manufactures a composite.

A composite having a combination of fibers and a resin (or a plastic), which is also referred to as a fiber reinforced plastic (FRP), is light in weight and high in strength. Accordingly, the composite is used as a structural material, etc., in the field of vehicle, aircraft, and space.

The composite is manufactured by stacking fibers impregnated with a resin (i.e., prepregs) to form a stack and curing the resin thereafter. Examples of the prepreg that has been currently developed include a sheet-shaped prepreg and a tape-shaped prepreg.

For example, Japanese Unexamined Patent Application Publication (JP-A) No. 2004-058593 discloses a technique that adjusts a width of the tape-shaped prepreg. The technique causes the prepreg to pass through a rectangular-shaped groove formed on a flat plate. JP-A No. 2004-058593 teaches that the flat plate is heated upon causing the prepreg to pass through the groove to increase a fluidity of a resin contained in the prepreg.

SUMMARY

An aspect of the technology provides a composite manufacturing apparatus that includes a width determining mechanism and a gas supplier. The width determining mechanism has a body and a gas passage. The body has a path configured to allow a tape material including fibers impregnated with a resin to pass therethrough. The path has a bottom surface and a pair of wall surfaces. The pair of the wall surfaces form a gap that gradually decreases. The gas passage is provided inside the body and formed by the bottom surface having a plurality of through holes, and is in communication with the plurality of through holes. The gas supplier is configured to supply gas to the gas passage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A resin contained in a prepreg has adhesion. Accordingly, a technique disclosed in JP-A No. 2004-058593 can result in sticking of the resin contained in the prepreg onto a bottom surface of a groove upon causing the prepreg to pass through the groove. This hinders the passing of the prepreg through the groove, making it difficult or unable to adjust a width of the prepreg.

It is desirable to provide a composite manufacturing apparatus that makes it possible to reduce sticking of a prepreg to a groove that adjusts a width of the prepreg.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Composite Manufacturing Apparatus 100]

Figure 1:
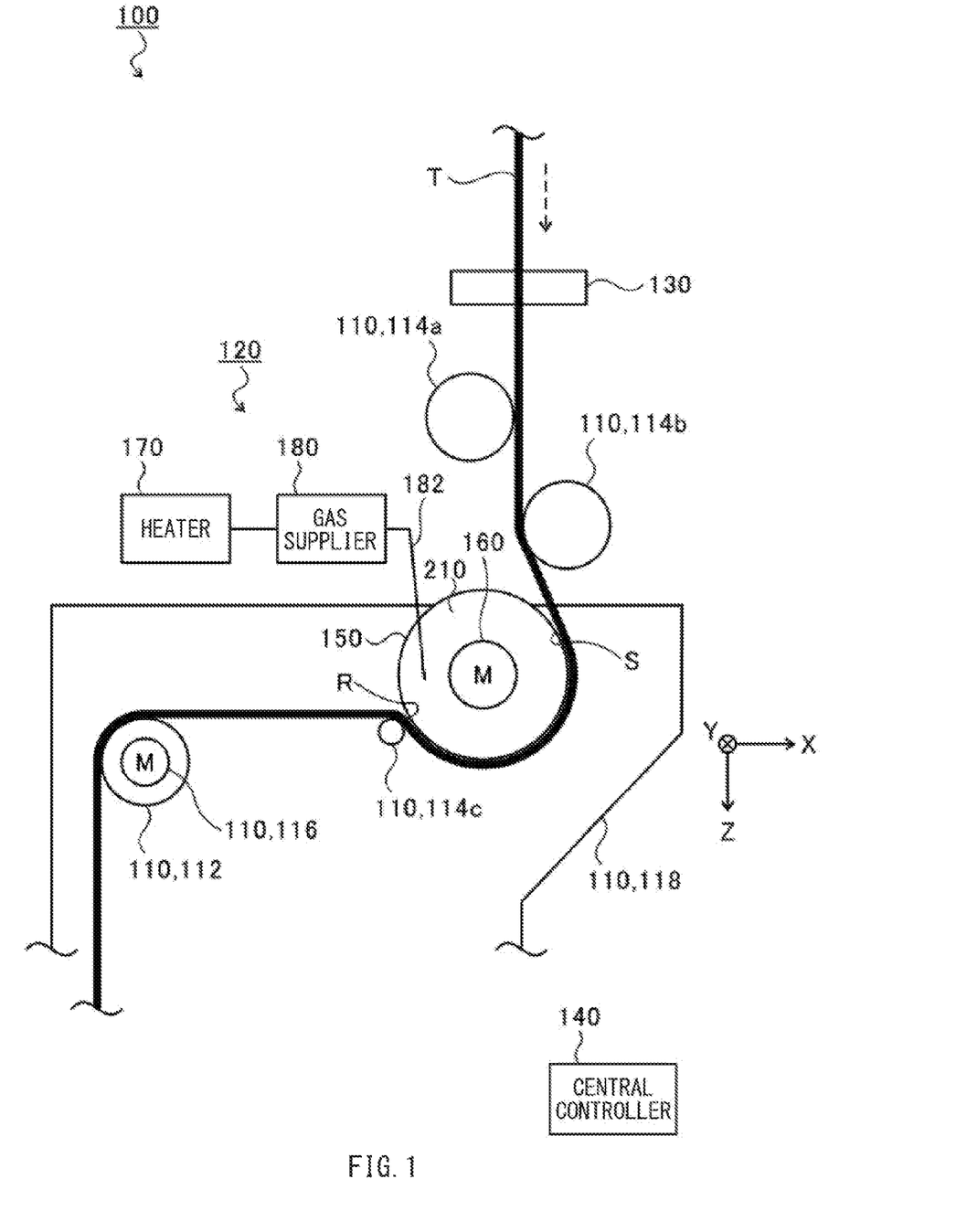
FIG. 1 is a diagram illustrating a composite manufacturing apparatus according to one example embodiment of the technology.

FIG. 1 is a diagram illustrating a composite manufacturing apparatus 100 according to an example embodiment of the technology. Referring to FIG. 1, the composite manufacturing apparatus 100 may include a feeding mechanism 110, a width adjusting mechanism 120, a heating device 130, and a central controller 140. In the following drawings including FIG. 1 according to an example embodiment, an X axis, a Y axis, and a Z axis that are perpendicular to each other with respect to a width determining mechanism 150 are defined as illustrated in those drawings. Note that a dashed arrow in FIG. 1 denotes a feeding direction of a tape material T to be fed by the feeding mechanism 110.

The feeding mechanism 110 may feed the tape material T in a longitudinal direction of the tape material T. For example, the tape material T may be fed from a stocked roller around which the tape material T is wound.

The tape material T may be a prepreg impregnated with a resin. The prepreg may be used as a material of a fiber reinforced plastic (FRP), i.e., a composite. Non-limiting examples of the FRP may include a carbon fiber reinforced plastic (CFRP) and a glass fiber reinforced plastic (GFRP).

The tape material T may have a thickness in a range from 20 micrometers to 240 micrometers. In some embodiments, the tape material T may have the thickness in a range from 20 micrometers to 120 micrometers. The tape material T having the thickness of 120 micrometers or less allows for easier deformation of the tape material T. Accordingly, the width adjusting mechanism 120 is able to adjust a width of the tape material T easily.

Fibers structuring the tape material T may be, for example, one or more of carbon fibers, glass fibers, boron fibers, aramid fibers, and polyarylate fibers such as Vectran (Registered trademark) fibers.

The resin structuring the tape material T may be a thermosetting resin or a thermoplastic resin.

The thermosetting resin may be, for example, one or more of a phenol resin (PF), an epoxy resin (EP), a melamine resin (MF), an urea resin (UF), an unsaturated polyester resin (UP), an alkyd resin, polyurethane (PUR), thermosetting polyimide (PI), benzoxazine, and polybismaleimide (BMI).

The thermoplastic resin may be, for example, polyphenylene sulfide (PPS), polytetrafluoroethylene, polysulfone (PSF), polyether sulfone (PES), amorphous polyarylate (PAR), liquid crystal polymer (LCP), polyether ether ketone (PEEK), thermoplastic polyimide (PI), polyamide-imide (PAI), polyamide (PA), nylon, polyacetal (POM), polycarbonate (PC), modified polyphenylene ether (modified PPE), polyethylene terephthalate (PET), polybutylene terephthalate (PBT), cyclic polyolefin (COP), polyethylene (PE), polypropylene (PP), polyvinyl chloride (PVC), polyvinylidene chloride, polystyrene (PS), polyvinyl acetate (PVAc), polyurethane (PUR), an ABS resin, an AS resin, an acrylic resin (PMMA), and polyether ketone ketone (PEKK).

As illustrated in FIG. 1, the feeding mechanism 110 may include a compaction roller 112, support rollers 114a to 114c, a motor 116, and a support base 118.

The compaction roller 112 and the support rollers 114a to 114c each may have a cylindrical shape or a columnar shape. The compaction roller 112 and the support rollers 114a to 114c may be provided at their respective positions that are different from each other in the longitudinal direction of the tape material T. The tape material T may be stretched over the compaction roller 112 and the support rollers 114a to 114c.

The compaction roller 112 may be provided downstream of the support rollers 114a to 114c in the feeding direction of the tape material T. The compaction roller 112 may be rotated by the motor 116. The motor 116 may be provided on the support base 118. The compaction roller 112 may be thus provided on the support base 118 via the motor 116. The compaction roller 112 may so pull the tape material T as to apply tension to the tape material T.

The support rollers 114a to 114c may be provided upstream of the compaction roller 112 in the feeding direction of the tape material T. The support roller 114c may be rotatably supported by the support base 118 around a shaft. The support rollers 114a to 114c may maintain the tension of the tape material T. The support rollers 114a to 114c may be rotated by frictional force between the support rollers 114a to 114c and the tape material T resulting from the rotation of the compaction roller 112.

The feeding mechanism 110 may thus feed the tape material T in the longitudinal direction with the tension of the tape material T being kept, owing to frictional force generated between the compaction roller 112 and the tape material T, the rotation of the compaction roller 112, the frictional force generated between the support rollers 114a to 114c and the tape material T, and the rotation of the support rollers 114a to 114c.

The width adjusting mechanism 120 may be provided between the support roller 114b and the support roller 114c. In an example embodiment, the width adjusting mechanism 120 may be provided on the support base 118. The width adjusting mechanism 120 may include the later-described width determining mechanism 150 having a path over which the tape material T is stretched. The width adjusting mechanism 120 may vary the width of the tape material T fed by the feeding mechanism 110. The tape material T having the width that has been varied by the width adjusting mechanism 120 may pass through the compaction roller 112, following which the tape material T may be stacked on a shaping die where a predetermined curing temperature is maintained to form the stacked tape material T into the composite. The width adjusting mechanism 120 will be described in greater detail later.

The heating device 130 may heat the tape material T. Non-limiting examples of the heating device 130 may include an electric heater, a heat exchanger, and a hot air blower. The heating device 130 may be provided upstream of the width adjusting mechanism 120 in the feeding direction of the tape material T. In an example embodiment, the heating device 130 may be provided upstream of the support roller 114a.

The central controller 140 may be or may include a semiconductor integrated circuit. The semiconductor integrated circuit may include a central processing unit (CPU). The central controller 140 may read out, from a read-only memory (ROM), a program, a parameter, etc., configured to operate the CPU itself. The central controller 140 may cooperate with a random-access memory (RAM) that serves as a work area and with any other electronic circuit to manage and control the composite manufacturing apparatus 100 as a whole. In an example embodiment, the central controller 140 may control the number of rotations, i.e., a rotation speed, of the motor 116 and an angle of rotation of a later-described rotary mechanism 160 of the width adjusting mechanism 120 described below.

[Width Adjusting Mechanism 120]

The width adjusting mechanism 120 includes the width determining mechanism 150. The width adjusting mechanism 120 may include the rotary mechanism 160 and a heater 170.

Figure 2:
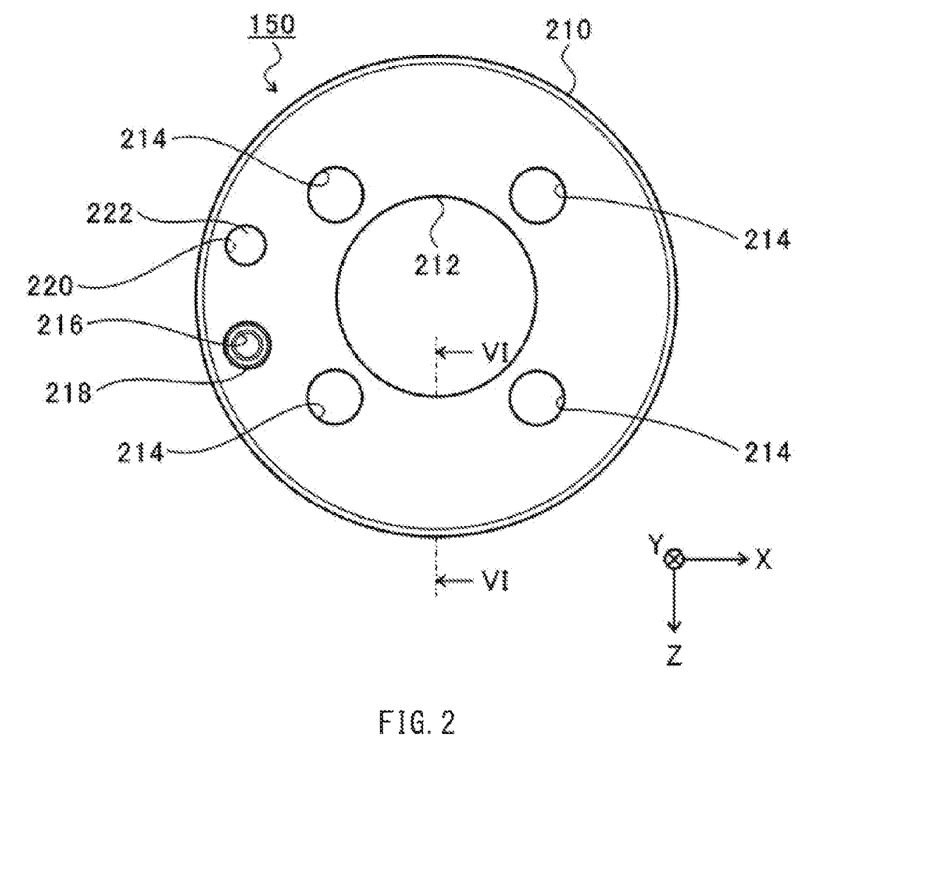
FIG. 2 is a front view of a width determining mechanism illustrated in FIG. 1.
Figure 3:
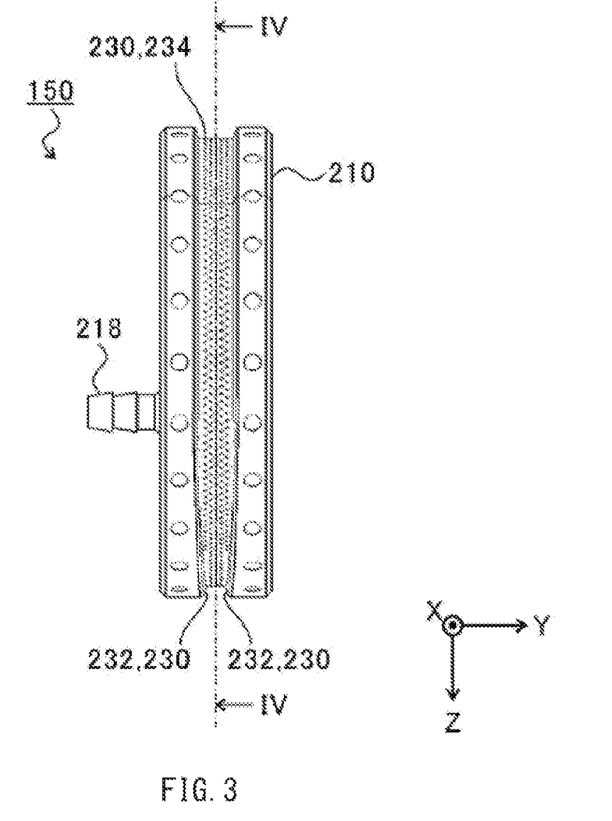
FIG. 3 is a side view of the width determining mechanism illustrated in FIG. 1.
Figure 4:
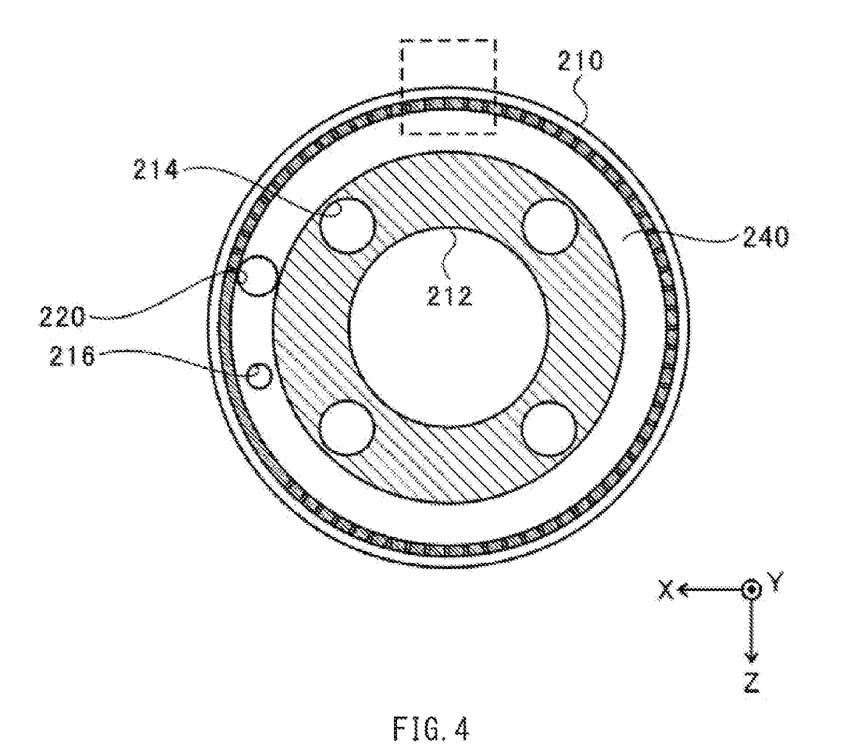
FIG. 4 is a cross-sectional view of the width determining mechanism taken along line IV-IV in FIG. 3.
Figure 5:
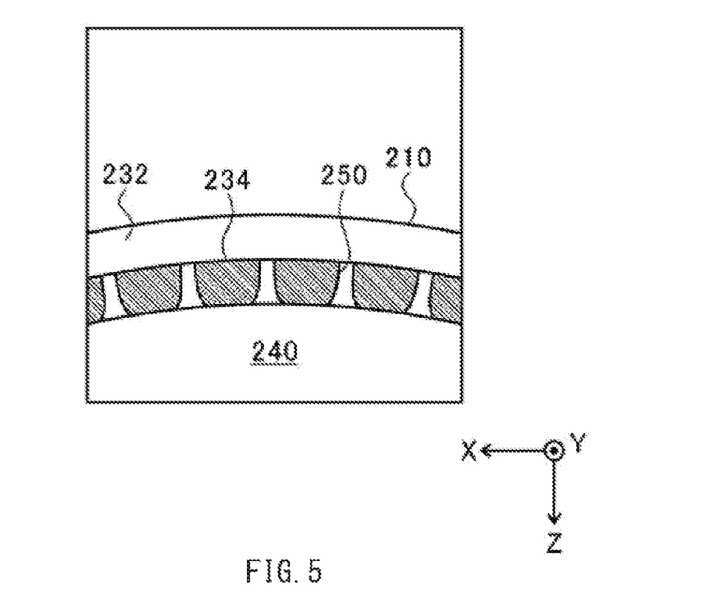
FIG. 5 is an enlarged diagram illustrating a portion of FIG. 4.
Figure 6:
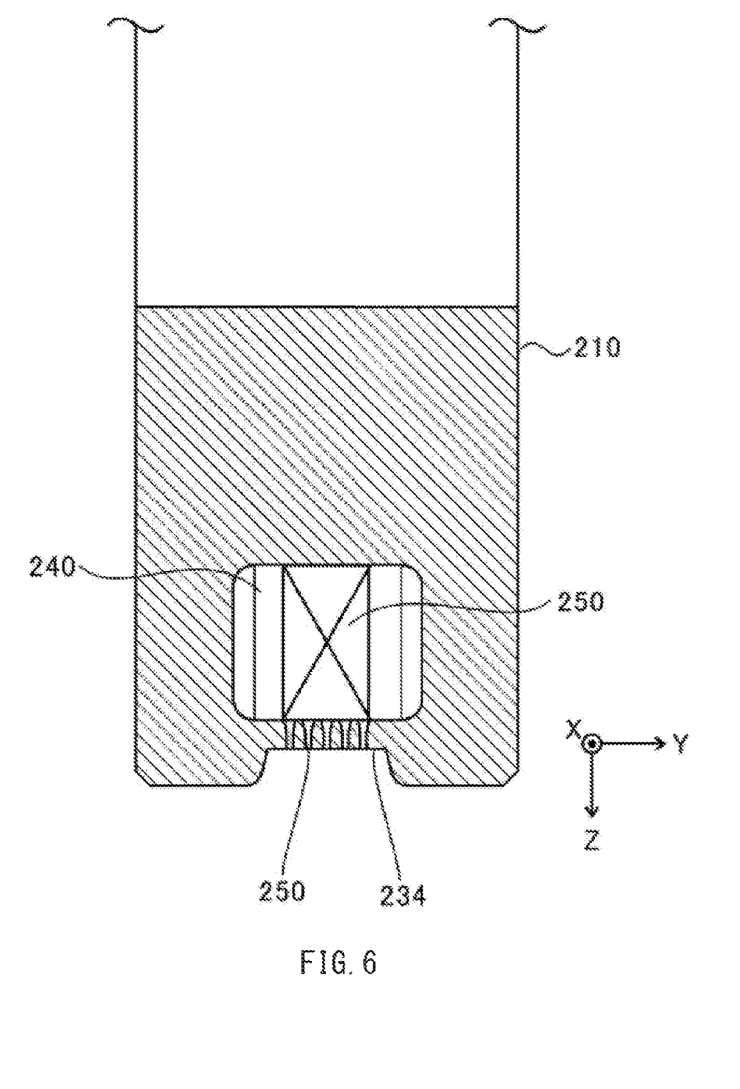
FIG. 6 is a cross-sectional view of the width determining mechanism taken along line VI-VI in FIG. 2.

FIG. 2 is a front view of the width determining mechanism 150. FIG. 3 is a side view of the width determining mechanism 150. FIG. 4 is a cross-sectional view of the width determining mechanism 150 taken along line IV-IV in FIG. 3. FIG. 5 is an enlarged diagram illustrating a portion surrounded by a broken line in FIG. 4. FIG. 6 is a cross-sectional view of the width determining mechanism 150 taken along line VI-VI in FIG. 2. Note that some of through holes 250 are unillustrated in FIGS. 4 to 6 for easier understanding.

In an example embodiment, the width determining mechanism 150 may be integrally formed by a three-dimensional (3D) printer. The width determining mechanism 150 may include a resin such as nylon, or may include a metal such as titanium. The width determining mechanism 150 may include a body 210 having a columnar shape as illustrated in FIGS. 2 to 5. The body 210 may have a middle through hole 212 provided in the middle of the body 210.

The body 210 may also have an outer surface having a plurality of connection holes 214, a gas supply port 216, a nozzle 218, and an outlet 220. The connection holes 214 may be coupled to the later-described rotary mechanism 160. The gas supply port 216 may be in communication with a later-described gas passage 240. The nozzle 218 may protrude toward an outer side of the body 210. The nozzle 218 may be in communication with the gas supply port 216. The outlet 220 may be in communication with the gas passage 240. The outlet 220 may be formed to discharge powder remaining in the gas passage 240 and the through holes 250 resulting from a manufacturing process of the width determining mechanism 150. The outlet 220 may be sealed by a sealing part 222 after having discharged the powder.

Referring to FIG. 3, the body 210 may have an outer circumferential surface having a path 230 (or a groove) provided in a circumferential direction. The body 210 has a pair of wall surfaces 232 and a bottom surface 234 that form the path 230. The path 230 may have a gap, or a width or a distance between the wall surfaces 232 in the Y-axis direction, which will be described later in greater detail.

Referring to FIGS. 4 to 6, the body 210 may have the gas passage 240 formed inside the body 210. The gas passage 240 may be a space formed inside the body 210. In an example embodiment, the gas passage 240 may have an annular shape. The gas passage 240 may be in communication with the gas supply port 216 and the outlet 220. The sealing part 222 may seal a part of the gas passage 240 to prevent the gas guided from the gas supply port 216 to the gas passage 240 from flowing back to the gas supply port 216.

Referring to FIGS. 5 and 6, the plurality of through holes 250 may allow the bottom surface 234 and the gas passage 240 to be in communication with each other. In other words, the plurality of through holes 250 is provided on the bottom surface 234, and the gas passage 240 may be in communication with the plurality of through holes 250. In an example embodiment, the through hole 250 may have an opening facing the gas passage 240 and an opening facing the bottom surface 234. The opening facing the gas passage 240 may be larger than the opening facing the bottom surface 234. The through hole 250 may have a flow path cross-sectional area that gradually decreases from the gas passage 240 to the bottom surface 234.

Returning to FIG. 1, the rotary mechanism 160 may rotate the body 210 within a predetermined range of an angle of rotation around an axis of rotation extending in an axial direction (i.e., a Y-axis direction in FIG. 1) of the body 210 of the width determining mechanism 150. For example, the rotary mechanism 160 may be or may include a motor.

Figure 7:
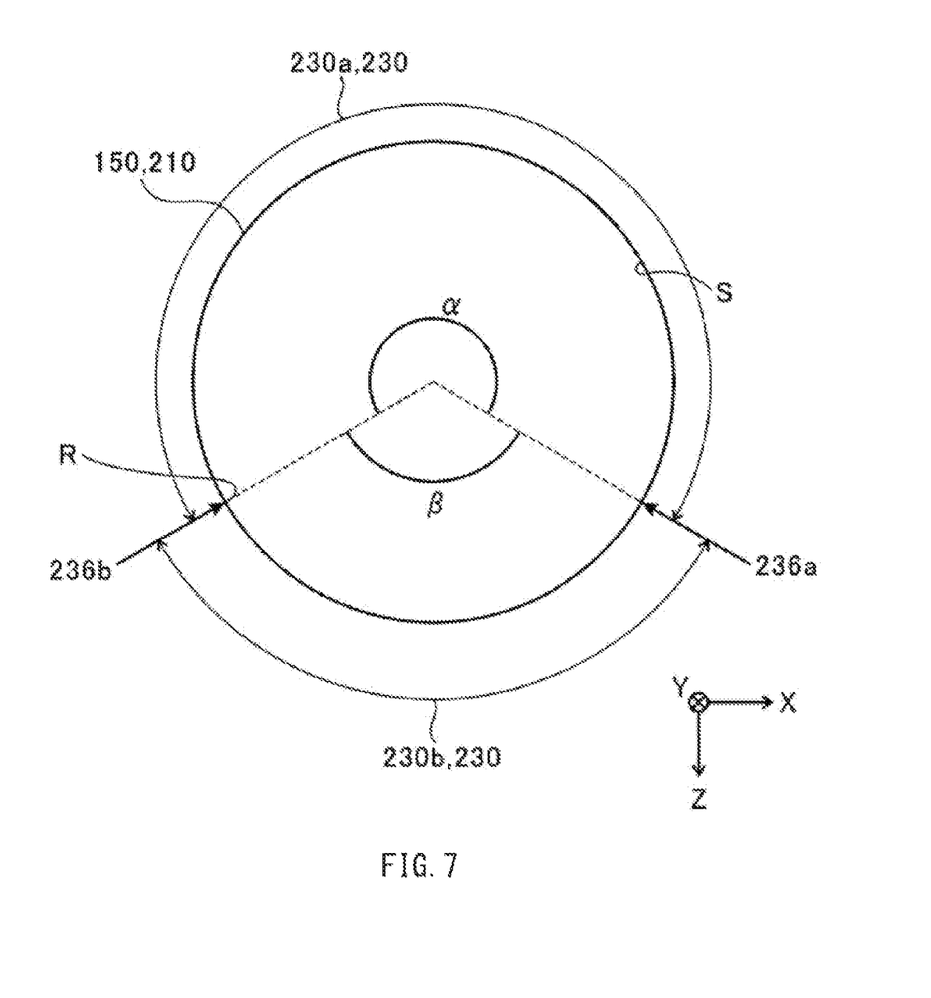
FIG. 7 is a diagram illustrating a gap of a path and a range of an angle of rotation.

FIG. 7 illustrates the gap of the path 230 and the range of the angle of rotation. Note that FIG. 7 only illustrates the body 210 for easier understanding. Referring to FIG. 7, a gap of a region 230a of the path 230 may be set to have a first width. The region 230a may correspond to a region having a predetermined angle $\alpha$ of the body 210. For example, the predetermined angle $\alpha$ may be 240 degrees. The first width may be a predetermined width that is equal to or greater than the width of the tape material T wound around the stocked roller. For example, the first width may be 6 mm.

A region 230b of the path 230 other than the region 230a may have a gap that gradually decreases from a first location 236a to a second location 236b. In other words, the gap of the region 230b of the path 230 may gradually decrease from the first location 236a to the second location 236b. The region 230b may correspond to a region having a predetermined angle $\beta$ of the body 210. For example, the predetermined angle $\beta$ may be 120 degrees. A gap of the first location 236a in the region 230b may be set to have the first width. A gap of the second location 236b in the region 230b may be set to have a second width. The second width may be a predetermined width that is shorter than the first width. For example, the second width may be 3 mm.

The rotary mechanism 160 may rotate the body 210 to vary the gap between the wall surfaces 232 serving as an exit of the tape material T in the path 230, with the gap between the wall surfaces 232 serving as an entrance of the tape material T in the path 230 being maintained to have the first width.

For example, in an example embodiment, the entrance of the tape material T in the path 230, i.e., a fixed position S (see FIG. 1) at which the tape material T enters the path 230, may be determined on the basis of a positional relationship between the support roller 114b and the width determining mechanism 150. Similarly, the exit of the tape material T in the path 230, i.e., a fixed position R (see FIG. 1) at which the tape material T leaves the path 230, may be determined on the basis of a positional relationship between the width determining mechanism 150 and the support roller 114c. In other words, the tape material T may enter the path 230 from the fixed position S, i.e., the entrance, and the tape material T may leave the path 230 from the fixed position R, i.e., the exit. Hence, a distance of the path 230 through which the tape material T passes may be constant, i.e., fixed.

The central controller 140 may control the rotary mechanism 160 to control the angle of rotation of the width determining mechanism 150, such that the region 230b of the path 230 is positioned at the fixed position R. In other words, the central controller 140 may so control the rotary mechanism 160 as to allow a region from the first location 236a to the second location 236b to be positioned at the fixed position R.

Accordingly, the range of the angle of rotation described above may be a range in which the body 210 is rotated clockwise at the angle of $\beta$ in FIG. 7 from a position at which the second location 236b is disposed at the fixed position R. In other words, the range of the angle of rotation may be a range in which the body 210 is rotated counterclockwise at the angle of $\beta$ in FIG. 7 from a position at which the first location 236a is disposed at the fixed position R.

Note that the region other than the region 230b of the path 230 may be the region 230a. Accordingly, the region 230a may be constantly positioned at the fixed position S, in a case where the central controller 140 controls the rotary mechanism 160 to allow the region 230b to be positioned at the fixed position R.

With this configuration, the tape material T may be guided to the region 230b in which the gap gradually decreases, and a pressure in a width direction of the tape material T may be applied to the tape material T from the pair of wall surfaces 232 that structure the region 230b. Thus, the width of the tape material T may become substantially equal to the gap, or the distance, between the wall surfaces 232. In this case, if a clearance between the fibers structuring the tap material T is assumed as not changing, a cross-sectional area in a transverse cross section of the tape material T does not change as well, meaning that a thickness of the tape material T may increase by an amount corresponding to an amount of shortening of the width of the tape material T. In other words, the width and the thickness of the tape material T may change with the cross-sectional area of the tape material T being kept constant.

Accordingly, the central controller 140 may so control the angle of rotation of the width determining mechanism 150 as to cause a region from the first location 236a to the second location 236b of the path 230 (i.e., the region 230b) to be positioned at the fixed position R. By simply controlling the angle of rotation of the width determining mechanism 150 by the central controller 140, it is possible to vary the gap between the wall surfaces 232 that serve as the exit of the tape material T in the path 230 to have any width from the first width to the second width, with the gap between the wall surfaces 232 that serve as the entrance of the tape material T in the path 230 being maintained to have the first width.

Returning to FIG. 1, the heater 170 may be coupled to an unillustrated gas supply source. Non-limiting examples of the gas may include air and nitrogen. The heater 170 may so heat the gas supplied from the gas supply source that a temperature of the gas falls within a predetermined melting temperature range. The melting temperature range may be a predetermined temperature range that includes a temperature at which the resin with which the tape material T is impregnated melts. In an example embodiment, the melting temperature range may be higher than a temperature at the time of stacking the tape material T on the shaping die. The heater 170 may supply the heated gas to a gas supplier 180.

The gas supplier 180 is configured to supply the gas heated by the heater 170 to the gas passage 240 of the width determining mechanism 150. For example, the gas supplier 180 may be or may include a blower or a pump. In an example embodiment, the gas supplier 180 may supply the gas to the gas passage 240 through a flexible pipe 182. The flexible pipe 182 may be coupled to the nozzle 218.

The gas supplied by the gas supplier 180 to the gas passage 240 may blow out from the bottom surface 234 of the path 230 through the plurality of through holes 250.

The composite manufacturing apparatus 100 according to an example embodiment described above may cause the gas to blow out from the plurality of through holes 250 provided on the bottom surface 234 that forms the path 230, or the groove. Thus, the composite manufacturing apparatus 100 is able to form a layer of gas between the bottom surface 234 and the tape material T, making it possible to float the tape material T above the bottom surface 234. Hence, it is possible for the composite manufacturing apparatus 100 to reduce sticking of the tape material T to the path 230 that adjusts the width of the tape material T.

In some embodiments, the width determining mechanism 150 may include the sealing part 222. Thus, it is possible to allow all of the gas supplied to the gas passage 240 to be blow out from the bottom surface 234 through the through holes 250. Hence, it is possible for the composite manufacturing apparatus 100 to form the layer of gas efficiently between the bottom surface 234 and the tape material T.

In some embodiments, the composite manufacturing apparatus 100 may include the heater 170. Thus, it is possible to reduce viscosity of the resin with which the tape material T is impregnated. Hence, it is possible for the heater 170 to further reduce the sticking of the tape material T to the path 230.

In some embodiments, the width determining mechanism 150 may be integrally formed as described above. Thus, it is possible to allow the bottom surface 234 of the path 230 to have a flat surface. Hence, it is possible to prevent damaging of the tape material T.

In some embodiments, the through hole 250 may have the flow path cross-sectional area that gradually decreases from the gas passage 240 to the bottom surface 234 as described above. Thus, it is possible to reduce resistance of the gas in the through hole 250. Hence, it is possible for the composite manufacturing apparatus 100 to allow the gas within the gas passage 240 to blow out from the through holes 250 efficiently.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in an example embodiment described above, the path 230 may include the region 230a having the substantially constant gap and the region 230b having the gradually-decreasing gap. In some embodiments, the path 230 may at least have the region 230b having the gradually-decreasing gap.

In an example embodiment described above, the width adjusting mechanism 120 may include the heater 170. In some embodiments, the heater 170 is not an essential element.

In an example embodiment described above, the body 210 may have a columnar shape. The shape of the body 210, however, is not limited thereto. In some embodiments, the body 210 may have a fan shape (a sector shape) having the angle of 2β. In some embodiments, the region 230a may be provided upstream of the region 230b.

The body 210 may have any shape as long as the body 210 has the path 230 having the gradually-decreasing gap. In some embodiments, the body 210 may be a rectangular flat plate.

The through hole 250 is not limited in its size, shape, number, and gas blowing pressure. It is sufficient for the composite manufacturing apparatus 100 to cause the tape material T to float above the bottom surface 234 substantially evenly.

In an embodiment described above, the width determining mechanism 150 may be integrally formed. In some embodiments, the width determining mechanism 150 may include a plurality of members.

The central controller 140 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 140. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 140 illustrated in FIG. 1.

The invention claimed is:

1. A composite manufacturing apparatus comprising:
a width determining mechanism having a body and a gas passage,
the body having a path configured to allow a tape material including fibers impregnated with a resin to pass therethrough, the path having a bottom surface and a pair of wall surfaces, the pair of the wall surfaces forming a gap that gradually decreases,
the gas passage being provided inside the body and formed by the bottom surface having a plurality of through holes, and being in communication with the plurality of through holes; and a gas supplier configured to supply gas to the gas passage.

2. The composite manufacturing apparatus according to claim 1, further comprising a heater configured to heat the gas to a predetermined melting temperature at which the resin melts, wherein the gas supplier is configured to supply the gas heated by the heater.

3. The composite manufacturing apparatus according to claim 1, further comprising a rotary mechanism configured to rotate the body around an axis of rotation of the body, wherein the body has a columnar shape, the path is formed on an outer circumferential surface of the body, the path includes a first region and a second region, the first region being formed by a first bottom surface of the bottom surface and a pair of first wall surfaces of the pair of wall surfaces, the pair of first wall surfaces forming a gap that is substantially constant, the second region being formed by a second bottom surface of the bottom surface and a pair of second wall surfaces of the pair of wall surfaces, the pair of second wall surfaces forming the gap that gradually decreases, and the second region is disposed downstream of the first region in a feeding direction of the tape material.

4. The composite manufacturing apparatus according to claim 2, further comprising a rotary mechanism configured to rotate the body around an axis of rotation of the body, wherein the body has a columnar shape, the path is formed on an outer circumferential surface of the body, the path includes a first region and a second region, the first region being formed by a first bottom surface of the bottom surface and a pair of first wall surfaces of the pair of wall surfaces, the pair of first wall surfaces forming a gap that is substantially constant, the second region being formed by a second bottom surface of the bottom surface and a pair of second wall surfaces of the pair of wall surfaces, the pair of second wall surfaces forming the gap that gradually decreases, and the second region is disposed downstream of the first region in a feeding direction of the tape material.

5. The composite manufacturing apparatus according to claim 1, wherein the width determining mechanism is integrally formed.

6. The composite manufacturing apparatus according to claim 2, wherein the width determining mechanism is integrally formed.

7. The composite manufacturing apparatus according to claim 3, wherein the width determining mechanism is integrally formed.

8. The composite manufacturing apparatus according to claim 4, wherein the width determining mechanism is integrally formed.

* * * * *